US009135714B1

(12) United States Patent
Gauf et al.

(10) Patent No.: US 9,135,714 B1
(45) Date of Patent: Sep. 15, 2015

(54) METHOD AND SYSTEM FOR INTEGRATING A GRAPHICAL USER INTERFACE CAPTURE FOR AUTOMATED TEST AND RETEST PROCEDURES

(71) Applicant: Innovative Defense Technologies, LLC, Arlington, VA (US)

(72) Inventors: Bernard Gauf, Vienna, VA (US); Scott Bindas, Rochester, MA (US); Matt Mursko, Berkley, MA (US)

(73) Assignee: INNOVATIVE DEFENSE TECHNOLOGIES, LLC, Arlington, VA (US)

( * ) Notice: Subject to any disclaimer, the term of this patent is extended or adjusted under 35 U.S.C. 154(b) by 274 days.

(21) Appl. No.: 13/687,311

(22) Filed: Nov. 28, 2012

Related U.S. Application Data

(60) Provisional application No. 61/564,009, filed on Nov. 28, 2011.

(51) Int. Cl.
*G09G 5/00* (2006.01)
*G06T 7/00* (2006.01)
*G06F 11/36* (2006.01)

(52) U.S. Cl.
CPC ............... *G06T 7/0085* (2013.01); *G06F 11/36* (2013.01)

(58) Field of Classification Search
None
See application file for complete search history.

(56) References Cited

U.S. PATENT DOCUMENTS 3,541,541 A * 11/1970 Engelbart ..................... 345/164
5,335,342 A * 8/1994 Pope et al. ................. 714/38.13
5,657,438 A * 8/1997 Wygodny et al. ................. 714/1
5,678,002 A 10/1997 Fawcett et al.
5,781,720 A 7/1998 Parker et al.
5,953,009 A * 9/1999 Alexander .................... 715/771
7,548,979 B2 6/2009 Hanners et al.
7,870,504 B1 * 1/2011 McIntosh et al. ............. 715/803
8,782,541 B2 * 7/2014 Hayner et al. ................ 715/764
8,793,578 B2 * 7/2014 Mounty et al. ................ 715/704
2003/0031992 A1 2/2003 Laferriere et al.
2004/0160438 A1 8/2004 Shih et al.
2006/0095949 A1 5/2006 Whish-Wilson et al.
2006/0284838 A1 * 12/2006 Tsatalos et al. ............... 345/156
2007/0083854 A1 * 4/2007 Mayer-Ullmann et al. ... 717/124
2009/0235122 A1 9/2009 Rovang et al.
2009/0307600 A1 * 12/2009 Arthur et al. .................. 715/740
2010/0077260 A1 * 3/2010 Pillai et al. ...................... 714/46

(Continued)

OTHER PUBLICATIONS

Memon, A.M. (2001). A Comprehensive Framework for Testing Graphical User Interfaces, See pp. 16, 18, 116, 117.

(Continued)

*Primary Examiner* — Devona Faulk
*Assistant Examiner* — William Beutel
(74) *Attorney, Agent, or Firm* — Hunton & Williams LLP

(57) ABSTRACT

According to an embodiment of the present invention, a computer implemented system and system for capturing an image for automated test and retesting using an image capture function provided by a computer processor comprises: a capture tool, comprising at least one processor, configured to capture a screen image, a click position and user interaction; an image processing module, comprising at least one processor, configured to receive the screen image and generate a sub-image based at least in part on the click position; and a display module, comprising at least one processor, configured to display the sub-image and the user interaction to the user for generating at least one automated test step.

18 Claims, 11 Drawing Sheets

(56) References Cited

U.S. PATENT DOCUMENTS

| | | | | |
|---|---|---|---|---|
| 2010/0115417 A1* | 5/2010 | Cox et al. | ...................... | 715/740 |
| 2010/0306702 A1* | 12/2010 | Warner | ......................... | 715/811 |
| 2011/0131551 A1* | 6/2011 | Amichai et al. | .............. | 717/125 |
| 2011/0214107 A1* | 9/2011 | Barmeir et al. | ............... | 717/125 |
| 2011/0314343 A1* | 12/2011 | Hoke et al. | ...................... | 714/45 |

OTHER PUBLICATIONS

Takahashi, J. (Nov. 2002). Effective automated testing: a solution of graphical object verification. Test Symposium, (ATS '02). Proceedings of the 11th Asian, pp. 284-291.

Ivory, M. Y. (2001). State of the Art in Automating Usability Evaluation of User Interfaces, ACM Computing Surveys.

* cited by examiner 510 512

| Action | Radial Menu |
|---|---|
| Single and double clicks; left, right, or center button | Click (down and up) of the desired mouse button, the desired number of times, over the desired image target. The radial menu may alos contain explicit "Mouse Click" menu options, however, a menu selection would not be necessary. |
| Mouse Down; left, right, or center button | 1. Mouse down of the desired mouse button on image target.<br>2. Mouse up over the "Mouse Down" radial menu option. |
| Mouse Up; left, right, or center button | 1. Mouse down of the desired mouse button on image target.<br>2. Mouse up over the "Mouse Down" radial menu option. |
| Move To Image | 1. Mouse down on image target.<br>2. Mouse up over the "Move To Image" radial menu option. |
| Verify Image | 1. Mouse down on image target.<br>2. Mouse up over "Verify Image" radial menu option. |
| Wait for Image | 1. Mouse down on image target.<br>2. Mouse up over "Wait For Image" radial menu option. |
| OCR | 1. Mouse down on image target.<br>2. Mouse up over "Initiate OCR" radial menu option.<br>3. Mouse down on the text search space image target.<br>4. Mouse up over the "Complete OCR" radial menu option. |

Figure 5

METHOD AND SYSTEM FOR INTEGRATING A GRAPHICAL USER INTERFACE CAPTURE FOR AUTOMATED TEST AND RETEST PROCEDURES

CROSS REFERENCE TO RELATED APPLICATION

This application claims priority to Provisional Application No. 61/564,009 filed on Nov. 28, 2011. The contents of this priority application are incorporated herein by reference in their entirety.

This application is related to co-pending U.S. patent application Ser. No. 13/605,182, entitled "Method and System for Implementing Automated Test and Retest Procedures," filed Sep. 6, 2012, which claims priority to Provisional Application 61/531,769 filed Sep. 7, 2012. The contents of which are incorporated herein by reference in their entirety.

STATEMENT REGARDING FEDERALLY SPONSORED RESEARCH OR DEVELOPMENT

This invention was made with Government support under contract N00024-11-G-4226 awarded by U.S. Navy. The Government has certain rights in the invention.

FIELD OF THE INVENTION

The present invention relates generally to image capture and more specifically to an enhanced image capture feature for automated test and retest procedures.

BACKGROUND OF THE INVENTION

Commercial and military systems today are largely software based and growing in complexity. However, despite advances in development practices and tools, the goals of accelerating the rate at which systems can be delivered and reducing their costs cannot be met by simply writing software faster. Delivering faster, cheaper, and higher quality software will only be met with comparable improvements in the practices and tools for automated testing and analysis. Current systems require constant supervision of testing software by trained individuals. Oftentimes, the testing procedures are time-consuming and burdensome.

A part of the testing process generally involves identifying Graphical User Interface (GUI) interactions. For example, an automated GUI test for a software system may include one or more GUI interactions. A single GUI interaction may be minimally defined by two pieces of information: the subject of the interaction, and the mechanics of the interaction. By selecting an icon (e.g., usually a mouse click), a certain function will occur (e.g., initiate an application, etc.). Selecting the same icon in a different manner (e.g., right click, double click, etc.) may provide a different result. The testing process may involve a series of GUI interactions for testing.

The traditional image capture approach requires multiple user interactions to capture an image. For example, a user typically uses multiple clicks to define the image and then provides additional inputs that describe the user interaction. Typically, the user inputs interaction specifics, such as button clicks and click count, using a menu. When complex systems with many discrete functions are being tested, the cumulative effort to capture each action can be burdensome and time consuming thereby resulting in testing inefficiencies. Other drawbacks may also be present.

SUMMARY OF THE INVENTION

Accordingly, one aspect of an embodiment of the present invention is to address one or more of the drawbacks set forth above. According to an exemplary embodiment, a computer implemented system for capturing an image for automated test and retesting using an image capture function provided by a computer processor, comprises: a capture tool, comprising at least one processor, configured to capture a screen image, a click position and user interaction; an image processing module, comprising at least one processor, configured to receive the screen image and generate a sub-image based at least in part on the click position; and a display module, comprising at least one processor, configured to display the sub-image and the user interaction to the user for generating at least one automated test step.

According to another exemplary embodiment, a computer implemented method for capturing an image for automated test and retesting using an image capture function provided by a computer processor, the method comprises: capturing, via a capture tool comprising at least one processor, a screen image, a click position and user interaction; receiving, via an image processing module comprising at least one processor, the screen image and generate a sub-image based at least in part on the click position; and displaying, via a display module comprising at least one processor, the sub-image and the user interaction to the user for generating at least one automated test step.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 5 is an exemplary table that lists Target Actions, according to an embodiment of the present invention.

DETAILED DESCRIPTION OF EXEMPLARY EMBODIMENT(S)

Figure 1:
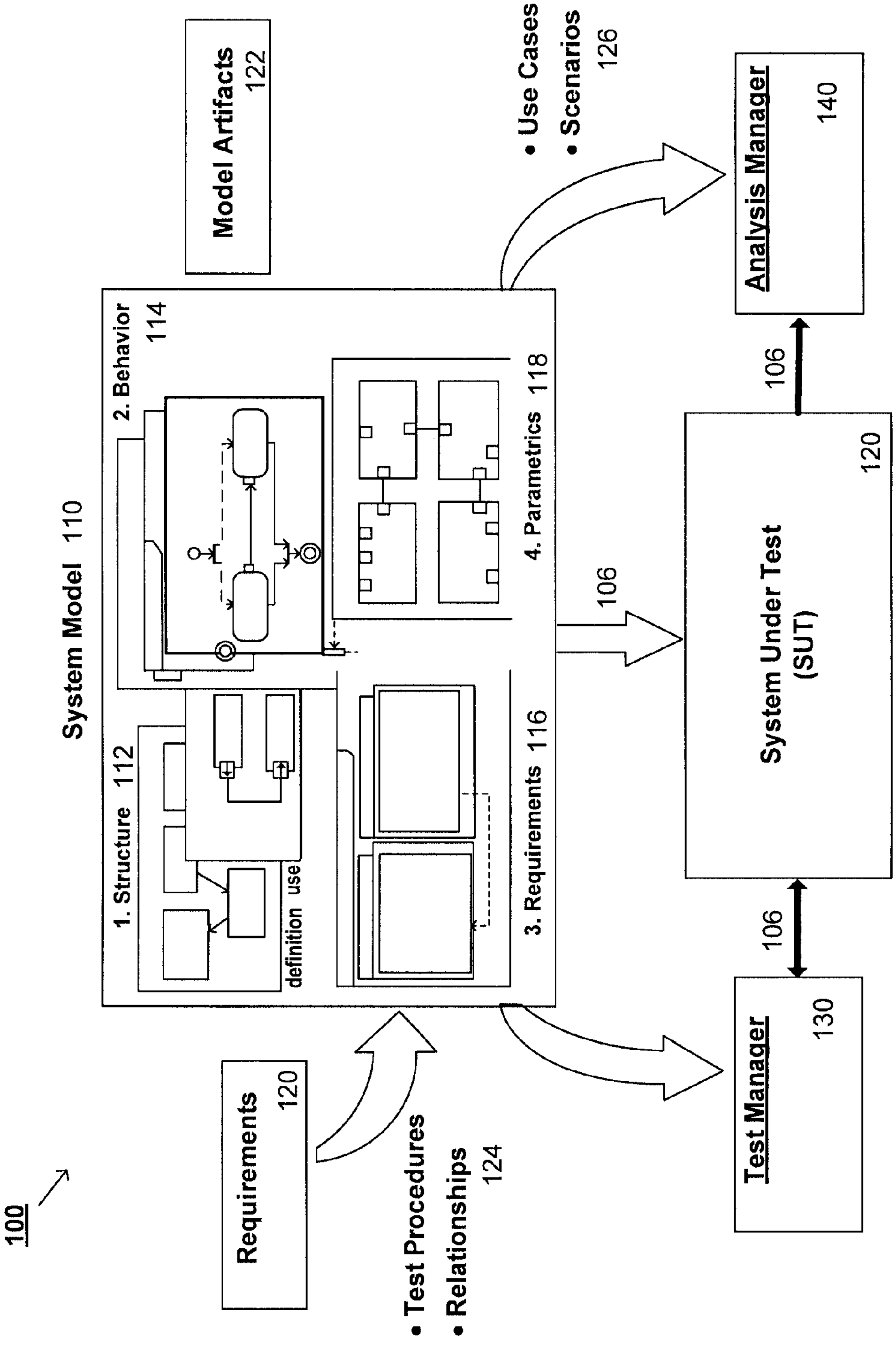
FIG. 1 is an exemplary diagram of a system for model-driven automated software testing, according to an embodiment of the present invention.

An embodiment of the present invention is directed to a novel method and system that allows a user to create an image based graphical user interface (GUI) interaction. For example, a user may capture a subject and one or more associated mechanics on the subject, with a single click. Generally, an image can be defined by specifying two opposing corner points of the rectangular bounding box that contains the desired image. The user can specify these points by clicking and stretching a bounding box around the image. This technique is known as "rubberbanding." At minimum, two clicks and a mouse movement are needed to define a bounding box: a click to define the upper left corner, a move mouse to the lower right corner, and a click to define the lower right corner. In order to use the captured image with a mouse image action, the user must specify the mouse button which should be clicked, and the number of times it should be clicked. This is normally done via a menu, and requires a mouse movement to the menu and a mouse click on the appropriate button/count combination. Thus, multiple user interactions and mouse movements may be needed to create a mouse image action.

An embodiment of the present invention is directed to efficiently capturing GUI-based automated tests. For example, an enhancement of an embodiment of the present invention minimizes the number of user interactions required to capture a mouse image action. For example, the image capture approach of an embodiment of the present invention (e.g., rubberbandless capture) provides the ability to capture a mouse image action with a single mouse click.

To capture a mouse image action with an image capture approach of an embodiment of the present invention, the user may click on a portion of an image of interest. The system under test (SUT) image and mouse click location may be sent to the image capture algorithm, which may return a pertinent sub-image calculated based upon the location clicked by the user. The desired mouse button and number of button clicks may be collected based on how the user initiates the image capture function. For example, an embodiment of the present invention may detect a specific mouse button that was clicked, and the number of times it was clicked. In this way, an embodiment of the present invention may determine the information for creating a mouse image action with a single mouse click (or minimal user action).

An embodiment of the present invention may provide a feedback mechanism that the user may leverage to verify that the captured image was correct. If the captured image is incorrect, an embodiment of the present invention may provide the ability to easily correct the image. For example, the system may revert to a deterministic mode of capture and/or simply redo the capture. Accordingly, the GUI capture of an embodiment of the present invention may be performed efficiently and further enable the user to easily modify and/or correct the image.

An embodiment of the present invention may be applied to various systems and processes, including an Automated Test and Re-Test (ATRT) process and suite of technologies to address automated testing of large complex systems and systems-of-systems. Additional details are provided in U.S. patent application Ser. No. 13/605,182, entitled "Method and System for Implementing Automated Test and Retest Procedures," filed Sep. 6, 2012, which claims priority to Provisional Application 61/531,769 filed Sep. 7, 2012, the contents of which are incorporated herein by reference in their entirety. A focus of the ATRT system is directed to reducing time and effort involved in conducting system integration and testing while expanding the depth and breadth of test requirement coverage. As a result, projects demonstrate a substantial reduction in test time while expanding test requirement coverage.

Model-driven automated software testing automates control of a system test via a Test Manager and analysis management of resulting test data via an Analysis Manager. A central System Model manages requirements, use cases and/or other information that encapsulates behaviors of a System Under Test (SUT). An auto-code generator may leverage the System Model and automatically generate code for efficient development of test cases. Once system modeling and metadata are complete, automated test steps or test flows may be created for a Test Manager and analysis flows may be created for an Analysis Manager.

A Test Flow may be a collection of one to many actions arranged to satisfy a specific goal. Test cases, test steps, and functions may each have corresponding Test Flows. Each Test Flow may in turn contain other Test Flows, such as test cases containing test steps, or a test step containing a function. Test Flows may be simple and linear, or may be complex, using conditional constraints or forks and joins to determine behavior.

Test Manager automates large scale system tests through execution of defined Test Flows by providing automated control over system displays and system control messages. The user may execute a predefined Test Flow which comes directly from the System Model, or the user may generate their own Test Flow using a repository of system actions. The Test Manager may then execute the Test Flow on the SUT and report the performance of each step within that flow.

Analysis Manager may perform various functions, such as extract, map, and link the fundamental data for testing from the SUT recorded raw data. Analysis Manager may then assess the data against Analysis Flows generated from the System model. System performance may be analyzed when the SUT data is executed through the verification and requirement steps defined in the Analysis Flows. Analysis Manager may then output a series of integrated reports and plots. An embodiment of the present invention recognizes that with the increase of test coverage comes an increase of test results that needs to be analyzed. Thus, an automated reporting capability on the increased test coverage and outcome, comparing expected versus actual results may be provided.

An embodiment of the present invention may combine Graphical User Interface (GUI) and non-GUI automated testing. GUI and message based testing capability for Systems Under Test (SUTs) may be provided when GUIs are unavailable or when GUI test automation is not beneficial, and Message Based testing is a viable solution. Also, GUI based automated testing may be enhanced with Message Based testing. Messages may include any message in any form that is sent from one device to another device through a network connection. Messages may include text, images, audio, video and/or other form of data, as well as various combinations thereof. Distributed testing over a network may involve automated tests executed over a network. For an exemplary test case, various GUI or message based outputs may be dependent on each other over a network. An example may involve: GUI output 1 is a prerequisite to GUI output 2, or to test other serial or parallel message or GUI based interactions. Concurrent testing support may be provided, for the test case where various test scenarios may run in parallel and race-conditions and other concurrency issues have to be detected, and simulation of live SUT interaction may be required. A batch processing feature may be provided for the case when various test cases may be executed together as a batch job as part of endurance or longevity testing.

FIG. 1 is an exemplary diagram of a system for model-driven automated software testing, according to an embodiment of the present invention. A system 100 of an embodiment of the present invention may include a System Model 110. As illustrated in FIG. 1, system 100 may include user communication devices associated with one or more users accessing the System Model 110 of an embodiment of the present invention. The user may establish a communication session with a communication device via a communication network 106.

System Model 110 may be accessed by a user communication device, such as a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with an application system and the plurality of communication devices (e.g., computer, wireless mobile communication device, etc.) associated with other users via the communication network 106.

A communication network 106 may be coupled to System Model 110 and one or more communication devices (e.g., user communication devices, etc.). SUT 120 may communicate with Test Manager 130 and Analysis Manager 140 via communication network 106. The communication network 106 may be a wireless network, a wired network or any combination of wireless network and wired network. For example, the communication network 106 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 106 may include, without limitation, telephone line, fiber optics, IEEE Ethernet 802.3, wide area network ("WAN"), local area network ("LAN"), or global network such as the Internet. The communication network 106 may support an Internet network, a wireless communication network, a cellular network, or the like, or any combination thereof. The communication network 106 may further include one, or any number of the exemplary types of networks mentioned above operating as a stand-alone network or in cooperation with each other. The communication network 106 may include a plurality of mobile switching centers (MSCs) and a plurality of signaling control points (SCPs).

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System Model 110 may access databases and/or other sources of information in accordance with an embodiment of the present invention. The databases may be further combined and/or separated. The databases may reside at a single location or separated through multiple locations. In addition, the databases may be supported by an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Data and information may be stored and cataloged in Databases which may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to System Model, which, in some embodiments, it is accessible through a network, such as communication network, e.g., 106 illustrated in FIG. 1, for example.

As shown in FIG. 1, Model-Driven Automated Software Testing (AST) technology automates scenario control of a system test (via Test Manager 130) as well as analysis management of the resulting test data (via Analysis Manager 140). A central System Model 110 manages the system test flows, requirements, and analysis behavioral threads (e.g., system Use Cases), when combined define a test procedure. An embodiment of the present invention may be directed to an auto-code generator that leverages the model and automatically generates code that may be compiled into the software suite. Auto-generation allows for rapid development of test cases and utilizes a centralized system engineering architecture.

As shown in FIG. 1, System Model 110 may include various modules and components. In this exemplary illustration, System Model 110 may include Structure 112, Behavior 114, Requirements 116 and Parametrics 118. System requirements, shown by 120, may be received by System Model 110. System requirements may include test procedures, relationships and/or descriptive testing metadata. System Model 110 may then manage various systems requirements, system behaviors, and system tests. According to an exemplary implementation, System Model 110 may include a Systems Modeling Language tool or other modeling language tool, or may even include a home-grown model or other customized model. Regardless, standard system engineering modeling practices may be supported, and system requirements may be read in and linked directly within System Model 110.

System Model 110 may define numerous Industry standard artifacts and/or other artifacts, as represented by Model Artifacts 122. Model Artifacts 122 may include use cases, requirements traceability, activity diagrams, sequence diagrams, verification steps, test procedures and/or other information that encapsulate behaviors of the System Under Test (SUT). An embodiment of the present invention may utilize an approach that incorporates descriptive metadata into the model to facilitate auto-code generator.

Once the system modeling and metadata are complete for a project, Test Flows may be created for Test Manager 130, and Analysis Flows may be created for Analysis Manager 140. According to an embodiment of the present invention, a Test Flow may describe the series of events for controlling and testing the SUT and SUT environment while under test. Analysis Flows may describe detailed verification steps for completing assessment of internal requirements and algorithms of the SUT.

Test Manager 130 may be used to automate large scale system tests through execution of defined Test Flows by providing automated control over system displays and system control messages. Some of the displays and messages drive system simulators or system consoles that may be used for full closed-loop testing. A user may manage a Test Flow within the Test Manager. For example, the user may execute a predefined Test Flow which comes from the System Model, or the user may generate their own Test Flow using a repository of system actions. The Test Manager may then execute the Test Flow on the SUT and report the performance of each step within that flow.

Analysis Manager 140 may automate data analysis, performance assessment, and expand test coverage for lower-level software and algorithm requirements levied within the SUT. Analysis Manager 140 may perform various functions, such as extract, map, and link the fundamental data for testing from the SUT recorded raw data. Typically, raw data sets from multi-day test events may be enormous in size and often contain windows of erroneous data caused by software and hardware failures during test time. Isolating and organizing the data allows for timely evaluation and analysis. Analysis Manager 140 may then assess the data against Analysis Flows generated from the System model. System performance may be analyzed when the SUT data is executed through the verification and requirement steps defined in the Analysis Flows. Also, Analysis Manager 140 may receive use cases, scenarios and/or other data from System Model 110. Analysis Manager 140 may then output a series of integrated reports and plots. These reports may include requirements, pass/fail reports, verification methods for each requirement within the reports, system performance analysis results, and plots which characterize the events.

Figure 2:
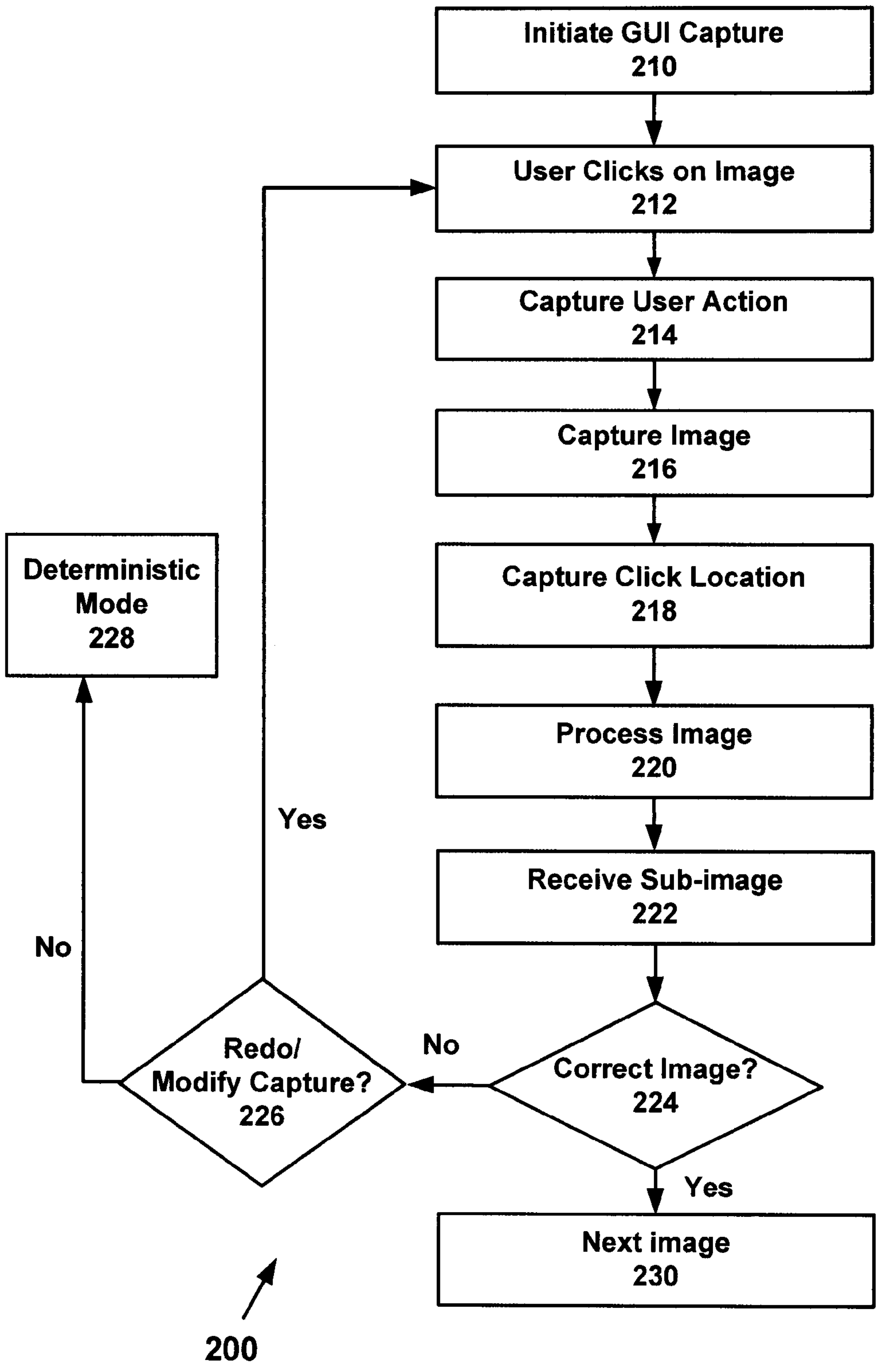
FIG. 2 illustrates an exemplary method for implementing an image capture feature, according to an embodiment of the present invention.

FIG. 2 illustrates an exemplary method for implementing an image capture feature, according to an embodiment of the present invention. At step 210, a GUI capture feature in a testing environment may be initiated. At step 212, a user may click on an image of the system under test. At step 214, user action may be captured. At step 216, the image may be captured. At step 218, a click location may be captured. At step 220, the image may be processed. At step 222, a sub-image may be generated. At step 224, the user may verify or confirm the accuracy of the GUI capture. If the image is not accurate, the user may redo the image capture at step 226. At step 228, the user may revert to a deterministic mode. If the image is accurate, a next image may be captured at step 230. This method is provided by way of example, as there are a variety of ways to carry out the methods described herein. Method 200 shown in FIG. 2 may be executed or otherwise performed by one or a combination of various systems. The method 200 may be carried out through system 100 of FIG. 1 by way of example. Each block shown in FIG. 2 represents one or more processes, methods, or subroutines carried out in method 200.

At step 210, a GUI capture feature in a testing environment may be initiated. The user may be presented with an image of a system under test (SUT). When implemented with a Test Manager, the image may be displayed in an editor that acts as a Remote Display client of the SUT. For example, a Remote Display client may serve as an interface between a SUT and a Test Capture. A Test Manager may interface with services on a SUT. Such services may include those that may be performed more effectively through a non display-based testing approach. Data may be exchanged with an instance of Test Manager via a web service interface. Remote display technology allows Test Manager's installation to be non-intrusive to the System under Test (SUT).

Also, the image may be updated continuously as the SUT is updated. A copy of the screen image may be saved when the user initiates an image capture of an embodiment of the present invention.

At step 212, a user may click on an image of the System Under Test. Examples of the image may include an image, a button, a menu item, text entry box and/or other item.

At step 214, user action may be captured. The user action may include a mouse click or other form of user interaction. In the example of a mouse click, the click type may include information such as mouse button (e.g., left, center, right) and number of clicks (e.g., single click, double click, mouse up, mouse down). For example, a mouse listener may be installed on the image of the SUT that observes user clicks. Other forms of user interaction may be captured. In addition, other input devices may be used. In this example, a mouse input is merely exemplary.

At step 216, the image may be captured. An entire image may be captured and stored for processing.

At step 218, a click location may be captured. For example, a (x, y) screen location of the mouse click may be captured and stored.

At step 220, the image may be processed. The processing may be based on the click location and user action. For example, the image may be processed by an image capture algorithm. The details are provided below in connection with FIG. 3.

At step 222, a sub-image may be generated. Based on the click location, a unique sub-image may be generated. An embodiment of the present invention may compare differences in shades of colors (or other variation) within the boundaries of an image. The pixels around the cursor may be scanned and processed. Because a portion of the image is used, an embodiment of the present invention provides efficiencies in speed and processing.

At step 224, the user may verify or confirm the accuracy of the GUI capture. For example, when used in a testing environment, Test Manager may provide an interface where the user is able to view the sub-image captured and verify the accuracy as well as uniqueness.

An embodiment of the present invention may provide one or more ways for the user to verify that the resulting image of a image capture is accurate. For example, each phase of the algorithm may be drawn (e.g., outlined, highlighted) on a Remote Display client session. This may provide the user with fast and unobtrusive feedback that the correct or incorrect image has been captured. According to another example, the newly created GUI Action may appear on a canvas. The captured image may appear in one of the drawers within the newly created GUI Action. Thus, the user may look at the captured image to determine if it is correct.

Also, a GUI Action Editor or other interface may display the captured image for evaluation by the user. For each captured image, the user may further open an Image Target Viewer. This allows the user to view the exact image that was captured, as well as the entire (or portion of the) screen at the time of the capture. If data from the algorithm is stored with the captured image, the user may be presented with options to modify or recapture the image from this view.

If the image is not accurate, the user may modify the image capture at step 226. If the image capture algorithm data is saved with the captured image itself, the user may be presented with a series of controls to modify the captured image. These controls may be provided in an Image Target Viewer, docked image viewer window and/or other interface. The user may edit the existing image. The entire, original SUT image may be stored with the image. In the Image Target Viewer, this may be used to recapture the image in rubberband mode. For example, the user may simply undo or delete the incorrectly captured action, toggle to rubberband mode, and recapture the image.

At step 228, the user may revert to a deterministic mode. If the user is unable to suitably adjust the captured image, or thinks it would be faster to rubberband the image, the system may provide an option to operate in a rubberband mode. When rubberbandless capture is an option, a toggle button (and hotkey combination) may switch the capture mode to the traditional rubberband based capture and vice versa. For example, the application may provide an option (e.g., button) to convert the rubberbandless captured image to a bounded rectangle, allowing the user to adjust the boundaries of the newly rubberbanded rectangle.

Rubberbanding has the advantages of being very precise, and the ability to present the user with a high degree of intuitive feedback. The image that is captured is always exactly the image contained within the bounding box; there is no ambiguity about which portions of an image are captured or not. For active feedback, the user can see the bounding box continuously change as it is dragged by the user. If the image captured is correct, a next image may be captured at step 230.

Figure 3:
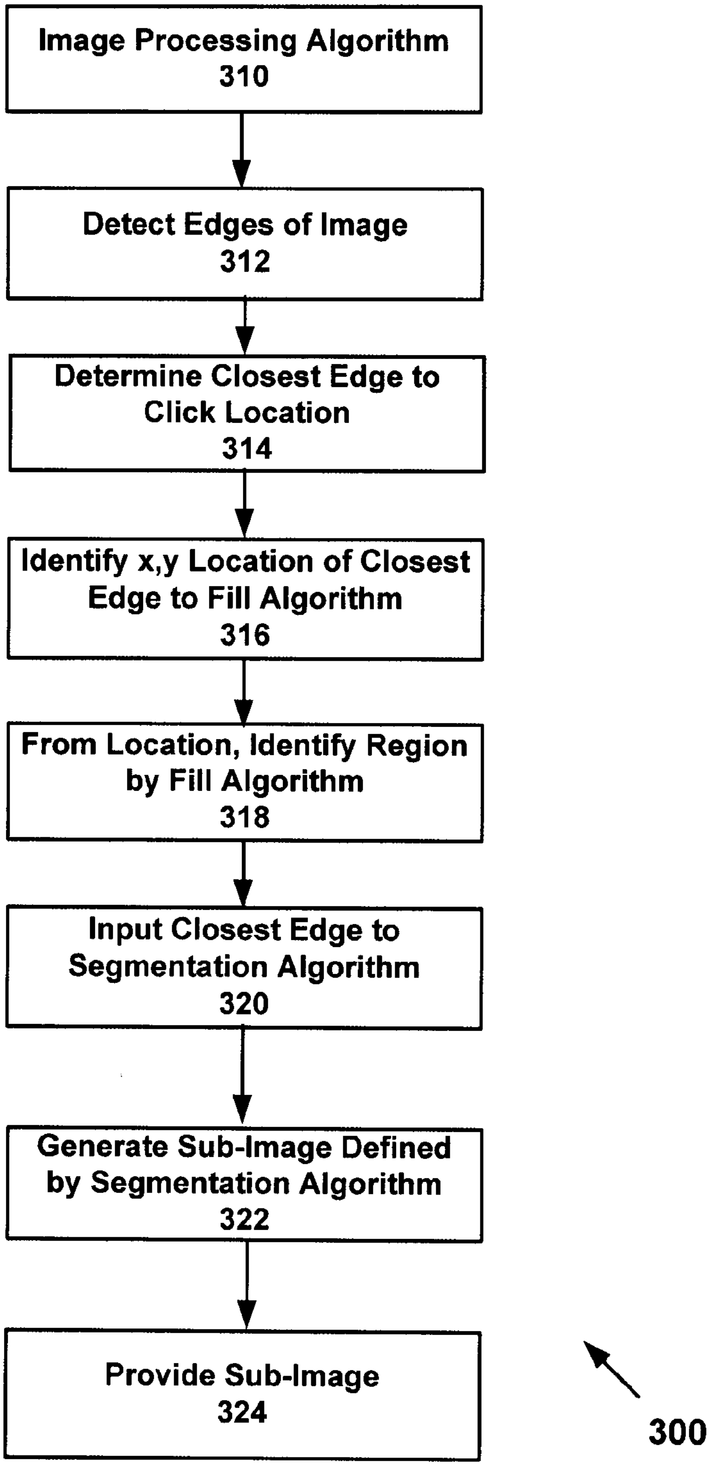
FIG. 3 is an exemplary method illustrating image processing, according to an embodiment of the present invention.

FIG. 3 is an exemplary method illustrating image processing, according to an embodiment of the present invention. At step 310, an image processing algorithm may be initiated. At step 312, edges of the image may be detected. At step 314, using the click location, a closest edge may be determined. At step 316, coordinates of the closest edge may be determined. At step 318, a region based on the closest edge may be identified. At step 320, input seed points of the region may be determined. At step 322, pixels defining the subject region may be determined. At step 324, sub-image may be identified based on the click location. This method is provided by way of example, as there are a variety of ways to carry out the methods described herein. Method 300 shown in FIG. 3 may be executed or otherwise performed by one or a combination of various systems. The method 300 may be carried out through system 100 of FIG. 1 by way of example. Each block shown in FIG. 3 represents one or more processes, methods, or subroutines carried out in method 300.

At step 310, an image processing algorithm may be initiated. For example, a Test Manager may run the image processing algorithm based on the image saved in step 216 and the clicked location in step 218. Using these two inputs, the following image processing techniques may determine the distinct subject of what was clicked.

At step 312, edges of the image may be detected. A filter may be used to detect edges within the original image. An exemplary filter may include a discrete differentiation operator for computing an approximation of the gradient of the image intensity function. The filter may calculate the gradient of the image intensity at each point, giving the direction of the largest possible increase from light to dark and/or the rate of change in that direction. The result may provide how the image changes at a point and therefore how likely that part of the image represents an edge, including how that edge is likely to be oriented. Also, a magnitude calculation may be implemented. The clicked point may then be used to determine the closest edge. This closest edge may serve to define the subject.

At step 314, using the click location, a closest edge may be determined. At step 316, coordinates of the closest edge may be determined. The x,y location of the closest edge may be provided to a Fill Algorithm. The Fill Algorithm may be started at this point, resulting in a region defined by connected portions of the closest edge. For example, the Fill Algorithm may determine an area connected to a given node in a multi-dimensional array.

At step 318, a region may be identified by the Fill Algorithm. At step 320, a fully defined closest edge may then be provided to a Segmentation Algorithm as seed points of the region. The Segmentation Algorithm may examine neighboring pixels of the seed points and determine whether the pixel neighbors should be added to the region. For example, if the neighboring seed points satisfy a predetermined threshold constraint, they may be added to the region. This process may iterate until the region can no longer be grown. At step 322, pixels defining the subject region may be determined.

At step 324, a sub-image may be identified based on the click location. Using the region defined by the segmentation operation, a sub-image may be extracted from the original image. The sub-image may be the final output of the algorithm. This sub-image may represent the distinct subject that the user clicked.

A GUI action may be created with the click characteristics saved and the sub-image calculated by the image processing algorithm. The click type and sub-image may be used to replay the user click in the original image captured.

Figure 4:
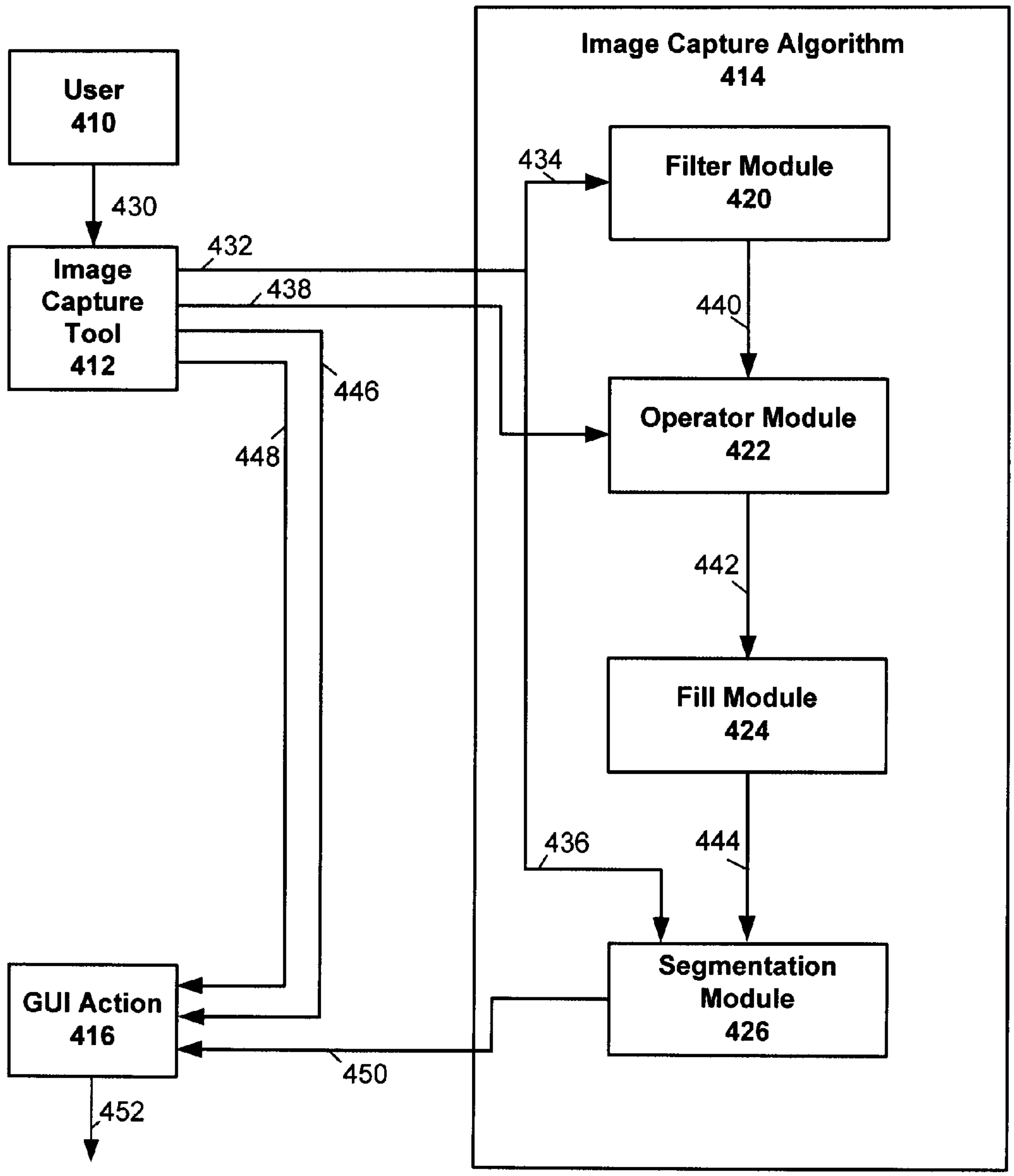
FIG. 4 is an exemplary illustration of a capture algorithm, according to an embodiment of the present invention.

FIG. 4 is an exemplary illustration of a capture algorithm, according to an embodiment of the present invention. As shown here, User 410 may interact with an Image Capture Tool 412. As shown here, the user may mouse click on a screen item of interest at 430. Image Capture Tool 412 may then interact with Image Capture Algorithm 414. As shown here, Image Capture Algorithm 414 may include a Filter Module 420, an Operator Module 422, a Fill Module 424 and a Segmentation Module 426. Additional functionality and modules may be provided. The modules illustrated in FIG. 4 are merely exemplary. The modules may be combined in various combinations and/or further separated, and may reside on multiple systems and/or multiple components within a system. Other variations and/or architectures may be implemented.

As shown here, Image Capture Tool 412 may capture a screen image, as shown by 432 and forward the image to Filter Module 420, as shown by 434 and Segmentation Module 426, as shown by 436. Mouse click position may be sent to Operator Module 422, as shown by 438. Mouse click button and mouse click count may be sent to GUI Action Module 416, as shown by 446 and 448, respectively. Filter Module 420 may receive the screen image, as shown by 434. Filter Module 420 may process the input image and generate a filtered image derived from the screen image, composed of detected edges, as shown by 440. Operator Module 422 may receive mouse click position, as shown by 438, and the filtered image, as shown by 440 and determine a screen position of the edge nearest the mouse click position. Fill Module 424 may receive the screen position of the nearest edge and identify a region defined by the connected portion of the nearest edge, as shown by 444. Segmentation Module 426 may receive the screen image, as shown by 436, and region defined by the connected portion of the nearest edge, as shown by 444 and generate a sub-image. The sub-image may then be transmitted to GUI Action Module 416, as shown by 450. A GUI Action may then be generated as shown by 452 from GUI Action Module 416. This method is provided by way of example, as there are a variety of ways to carry out the methods described herein. Method 400 shown in FIG. 4 may be executed or otherwise performed by one or a combination of various systems. The method 400 may be carried out through system 100 of FIG. 1 by way of example. Each block shown in FIG. 4 represents one or more processes, methods, or subroutines carried out in method 400.

In order to fully integrate an image capture solution into an application, the user may specify which GUI action should be created for each image capture. For example, the user may specify the GUI action via a toolbar button click. The user may first click on the desired image to run the algorithm and cache the captured image. The user may then click on a GUI Action toolbar button, and the captured image may be added to the new action.

FIG. 5 is an exemplary table that lists Mouse Image Target Actions, and how each type may be captured using an exemplary radial menu approach, according to an embodiment of the present invention. As shown in FIG. 5, 510 illustrates exemplary actions and 520 illustrates corresponding exemplary radial menu options. According to an embodiment of the present invention, sophisticated methods of specifying a GUI Action for a given capture may be used. One exemplary option may include displaying a menu that contains each of the GUI Actions. The user may then select the desired GUI Action from the menu. Also, this menu option may be integrated into various other based capture modes to further alleviate moving the cursor to the toolbar.

For example, after the user has completed a mouse down over the desired image target, a radial popup menu may be displayed. A radial menu (e.g., a pie menu) may include a circular context menu where selection depends on direction. For example, a radial menu may include several options positioned around a center. Radial menus may be context-sensitive, showing different options depending on what the pointer was pointing at when the menu was requested. For example, a user may click and pop up a radial menu, view the labels, move the pointer in the desired direction, and then click to make a selection.

According to an exemplary scenario, a radial menu may be centered at the point clicked by the user, and contain GUI Action icons and labels, allowing the user to quickly and accurately select the GUI Action to create with minimal movement of the mouse. Additionally, non image-based actions may be added to the radial menu, such as mouse to coordinate, type text, and wait actions. Also, the radial menu may be fully or partially configurable by the user. For example, the user may configure which GUI Actions appear on the radial menu, as well as the location on the menu that they appear. Another exemplary implementation may include a floating toolbar. Other variations, interfaces and types of menus may be implemented.

Figure 6:
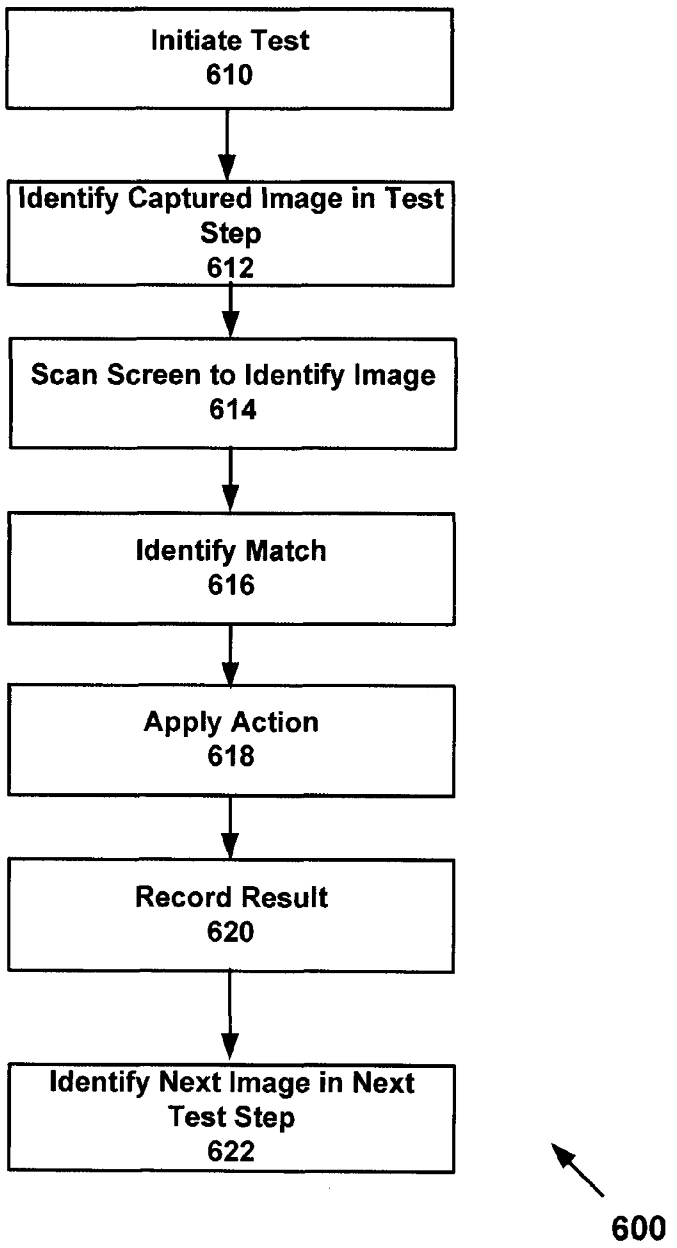
FIG. 6 is an exemplary flowchart illustrating a testing procedure using an image capture functionality, according to an embodiment of the present invention.

FIG. 6 is an exemplary flowchart illustrating a testing procedure using an image capture functionality, according to an embodiment of the present invention. At step 610, a testing procedure may be initiated. At step 612, a captured image may be identified. The image may be specified in a test step. At step 614, the screen may be scanned to identify the captured image. At step 616, a match may be identified. At step 618, user action associated with the captured image may be applied. At step 620, the result may be stored. At step 622, the next image may be identified in the next test step. This method is provided by way of example, as there are a variety of ways to carry out the methods described herein. Method 600 shown in FIG. 6 may be executed or otherwise performed by one or a combination of various systems. The method 600 may be carried out through system 100 of FIG. 1 by way of example. Each block shown in FIG. 6 represents one or more processes, methods, or subroutines carried out in method 600.

In order to assemble an automated GUI test, a user may create each of the GUI interactions that compose the test. At test execution time, the subject of the GUI interaction may be located, and then the mechanics of the GUI interaction may be performed on the subject.

One method of designating the subject of a GUI interaction may include storing an image of the subject. At the time that the GUI interaction is executed, the stored image may be used to locate the subject on the current screen state of the software system.

Figure 7:
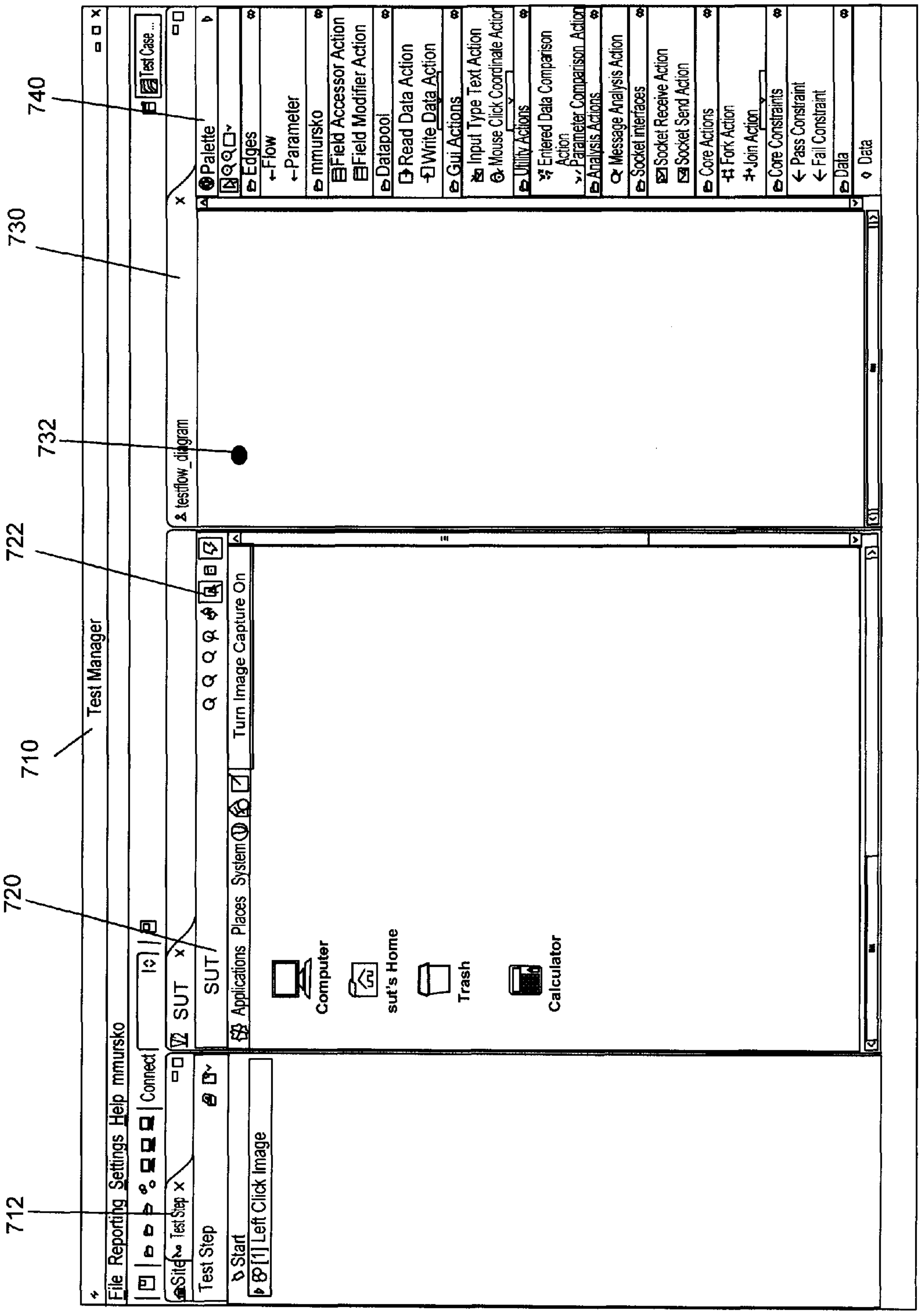
FIG. 7 is an exemplary screenshot illustrating an image capture functionality used in a Test Manager, according to an embodiment of the present invention.

FIG. 7 is an exemplary screenshot illustrating an image capture functionality used in a Test Manager, according to an embodiment of the present invention. FIGS. 7-11 illustrate exemplary systems where the various features of the image capture functionality may be utilized. The image capture functionality may be applied to various other systems, processes and environments. The ATRT process and system illustrated herein are merely exemplary and should not be construed to limit the various feature of the present invention.

Test Manager 710 enables a user to generate test flows for execution on a System Under Test. As shown here, Panel 712 provides a list of test steps, which may further include projects, tests, constraints, etc. Panel 720 illustrates a System Under Test (SUT). In this case, four icons are represented. An image capture icon may be initiated at 722. Panel 730 illustrates details of a test flow diagram. Panel 730 provides a canvas or workspace on which the user may construct models to represent execution flow. As shown here, 732 represents a starting point. Palette 740 illustrates collections of modeling components that serve as building blocks for the canvas. Components may be added from Palette 740 to a canvas (shown by Panel 730) and arranged by the user to dictate the desired behavior of the test. An embodiment of the present invention uses a modular and extensible approach, where various plug-ins may contribute additional components to the palette using APIs.

Figure 8:
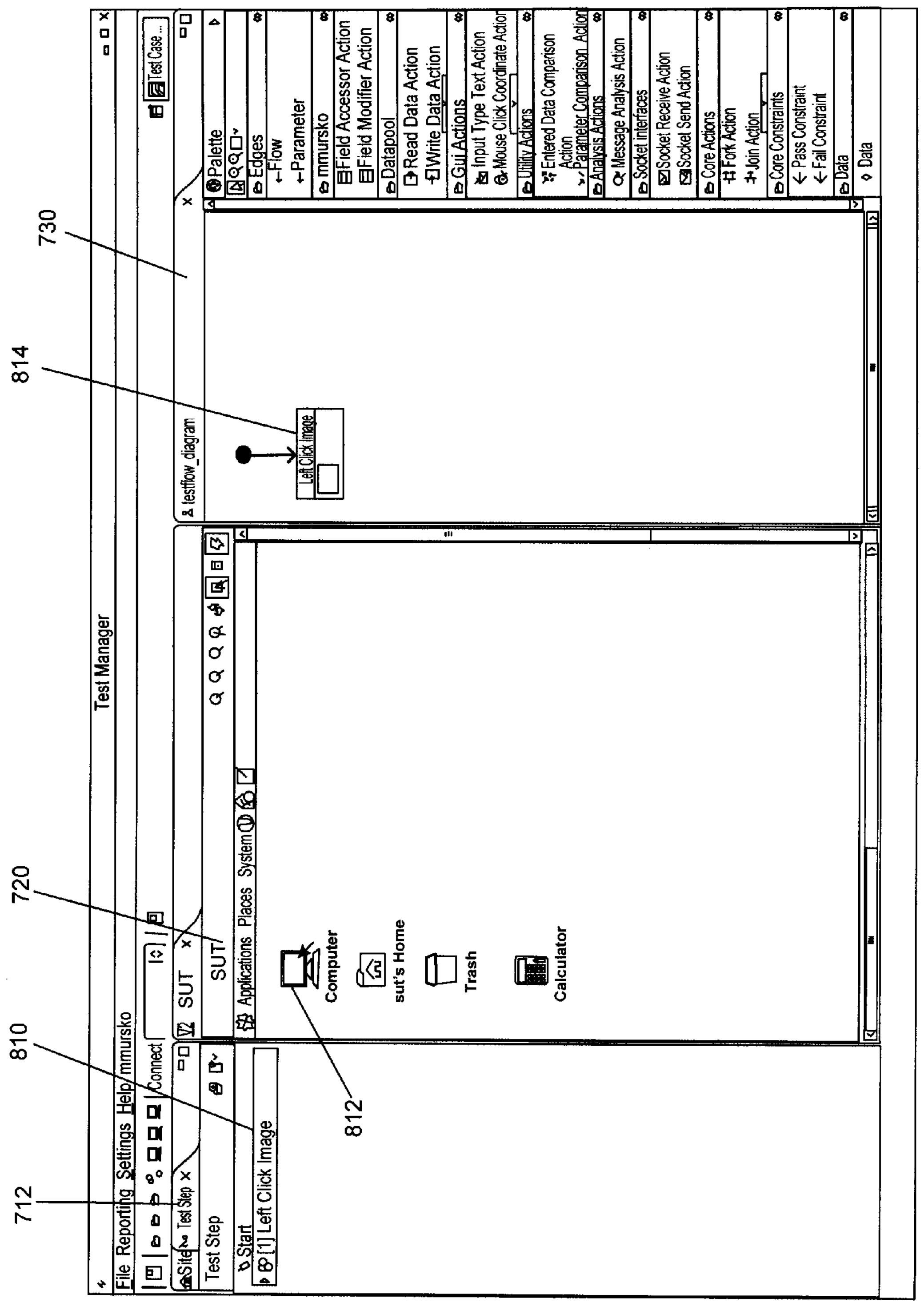
FIG. 8 is an exemplary screenshot illustrating an image capture functionality used in a Test Manager, according to an embodiment of the present invention.

FIG. 8 is an exemplary screenshot illustrating an image capture functionality used in a Test Manager, according to an embodiment of the present invention. In this exemplary application, a user selects a Computer Icon, shown by at 812. The image capture functionality of an embodiment of the present invention captures the image as well as the user interaction. The user clicks on the Computer Icon and initiates a left click of the mouse. Through this single click, an image capture feature of an embodiment of the present invention captures the image clicked (portion of the Computer Icon), click location and the user interaction (left click of the mouse). As shown in Panel 730, the captured image was initiated by a left click. A corresponding test step is captured and shown at 810. Other forms of user interaction may be captured. Also, interaction with other user inputs may be captured, a mouse click is one example.

Figure 9:
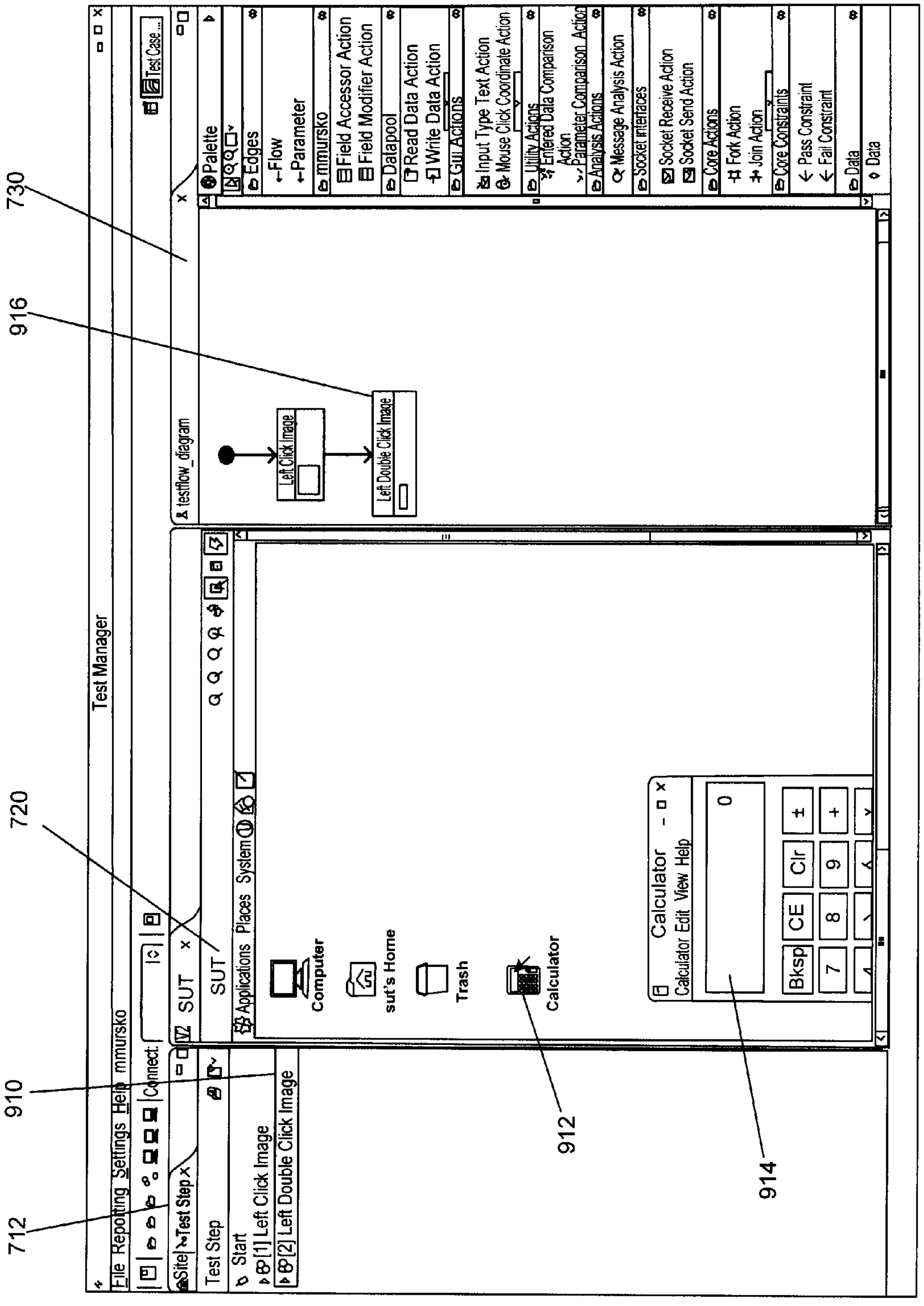
FIG. 9 is an exemplary screenshot illustrating an image capture functionality used in a Test Manager, according to an embodiment of the present invention.

FIG. 9 is an exemplary screenshot illustrating an image capture functionality used in a Test Manager, according to an embodiment of the present invention. FIG. 9 illustrates a next step in the process. Here, a next image is selected. The user selects a Calculator Icon at 912. When selected, the Calendar function may be displayed at 914. The image capture functionality of an embodiment of the present invention captures the click image as well as the user interaction. As represented in Panel 730, the captured image was initiated by a left double click, shown at 916. The captured image is a portion or sub-image of the entire image. A corresponding test step is captured and shown at 910.

Figure 10:
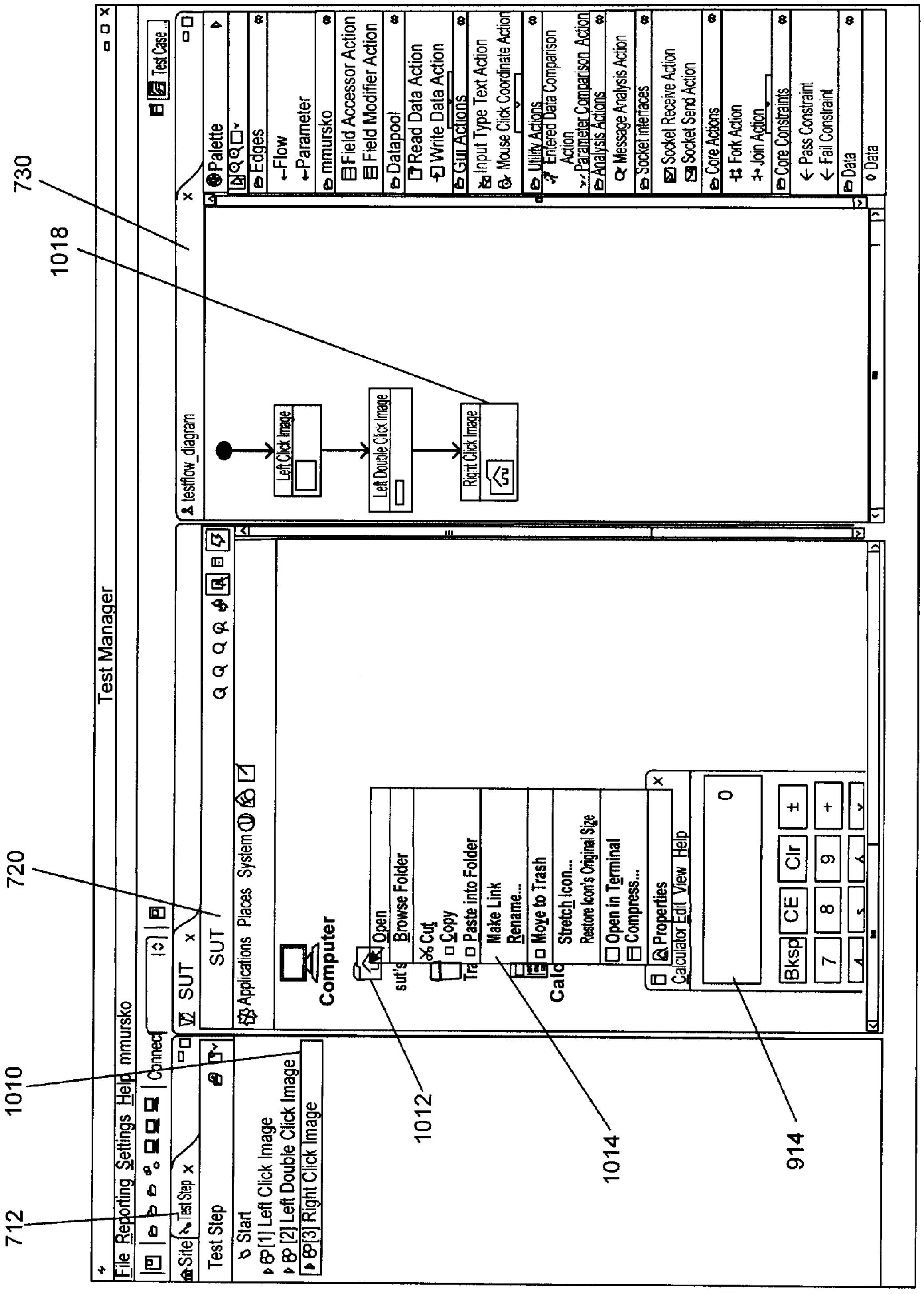
FIG. 10 is an exemplary screenshot illustrating an image capture functionality used in a Test Manager, according to an embodiment of the present invention.

FIG. 10 is an exemplary screenshot illustrating an image capture functionality used in a Test Manager, according to an embodiment of the present invention. FIG. 10 illustrates a next step in the process. Here, a next image is selected. The user selects a Folder Icon at 1012. The image capture functionality of an embodiment of the present invention captures the click image as well as the user interaction. As represented in Panel 730, the captured image was initiated by a right click, shown by 1018. The captured image is a portion or sub-image of the entire image. A corresponding test step is captured and shown at 1010. When the Folder icon is selected by a right click, a menu display is presented at 1014.

Figure 11:
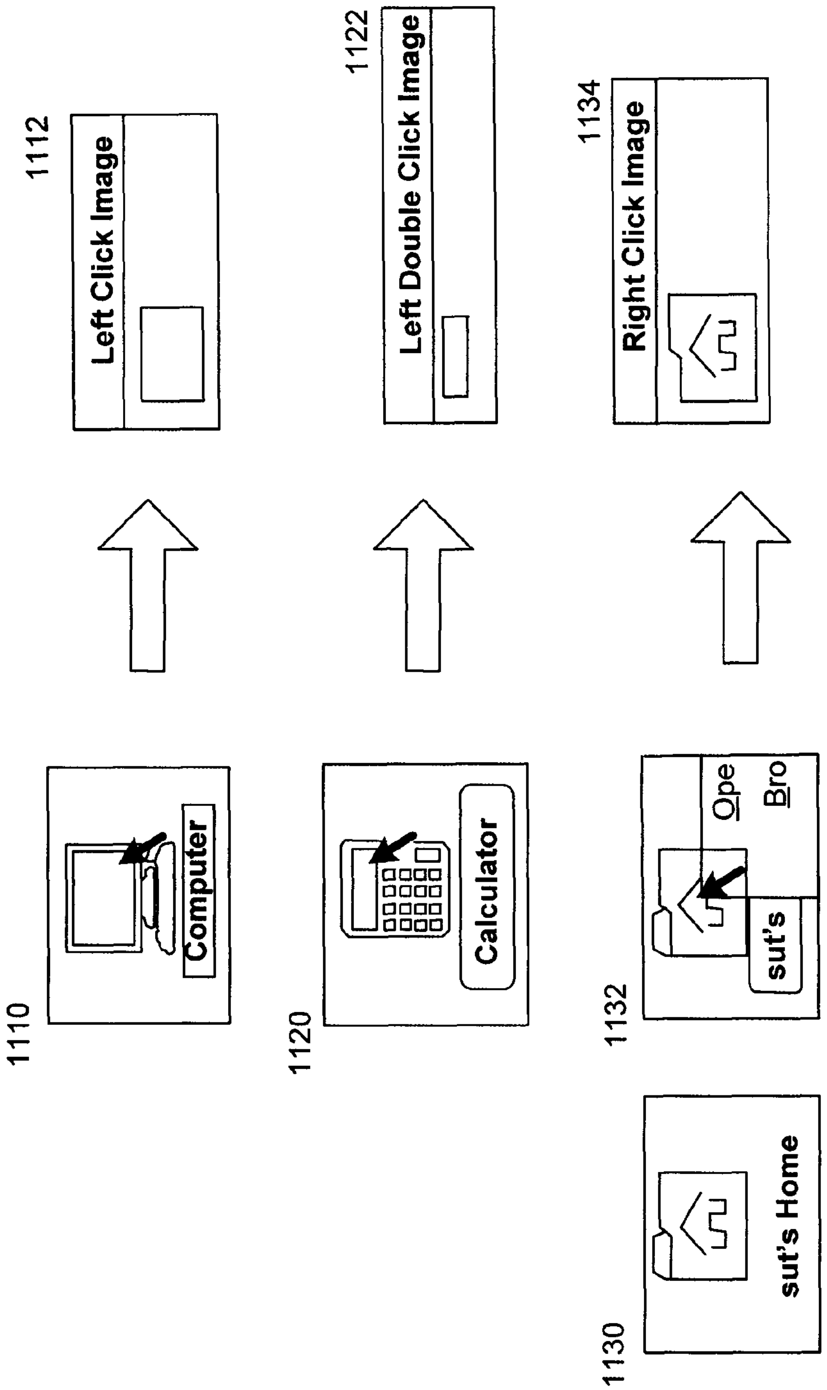
FIG. 11 is an exemplary diagram illustrating an image processing functionality of the image capture function, according to an embodiment of the present invention.

FIG. 11 is an exemplary diagram illustrating an image processing functionality of the image capture function, according to an embodiment of the present invention. When a user invokes a Computer Icon, shown by 1110, using a left click, from FIG. 7, an image capture function of an embodiment of the present invention generates a unique sub-image as well as the user interaction, shown by 1112. Likewise, when a user invokes a Calculator Icon 1120 using a double left click, from FIG. 8, an image capture function of an embodiment of the present invention generates a unique sub-image as well as the user interaction, shown by 1122. Also, when a user invokes a Folder Icon, full image shown by 1130 and clicked image shown by 1132, using a right click, From FIG. 10, an image capture function of an embodiment of the present invention generates a unique sub-image as well as the user interaction, shown by 1134.

The image capture function of an embodiment of the present invention provides an efficient system and method for capturing images and specific user actions with minimal user input. When used in with test and retest procedures, an embodiment of the present invention further provides an enhanced automated method and system for executing Test Flows in relation to a System Under Test. Moreover, the user is able to visually analyze captured images and associated user actions for confirmation as well as modification.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

The description above describes communication devices, an application system, a communication network having network elements, storage devices, various networks, and other elements for coupling user via the communication network, some of which are explicitly depicted, others of which are not. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer implemented system for capturing an image for automated test and retesting using an image capture function provided by a computer processor, the system comprising:

a capture tool, comprising at least one processor, configured to capture a screen icon, a click position and user interaction, where the user interaction identifies a mouse click button and a mouse click count, where the click position, the mouse click button and the mouse click count are associated with the screen icon and where the screen icon is captured by comparing shades of colors to identify a boundary of the screen icon;

an image processor configured to receive the captured screen icon and generate a sub-image defined by the boundary on the screen icon and based at least in part on the click position; and a test flow tool that provides modeling capability through an interface comprising a canvas display and a palette display;

the canvas display configured to automatically build a corresponding test flow graphically represented on the canvas display comprising the sub-image as defined by the boundary of the screen icon and the captured user interaction; and the palette display configured to display a collection of modeling components for building test flows on the canvas display.

2. The system of claim 1, the image processor further comprises: a filter configured to receive the captured screen icon and generate a filtered image comprising edges.

3. The system of claim 2, the image processor further comprises: a fill module, comprising at least one processor, configured to identify an edge proximate to the click position from the filtered image and generating a region based on the proximate edge.

4. The system of claim 3, the image processor further comprises: a segmentation module, comprising at least one processor, configured to identify a sub-image from the defined region.

5. The system of claim 1, wherein the capture tool is configured to capture a screen icon from a System Under Test.

6. The system of claim 1, the image processor further comprises: an interface configured to enable a user to confirm the captured screen icon.

7. The system of claim 1, the image processor further comprises: a tool bar for capturing the user interaction.

8. The system of claim 7, wherein the tool bar is a radial tool bar.

9. The system of claim 1, the image processor is further configured to revert to a manual capture for capturing one or more screen icons on a System Under Test.

10. A computer implemented method for capturing an image for automated test and retesting using an image capture function provided by a computer processor, the method comprising:

capturing, via a capture tool comprising at least one processor, a screen icon, a click position and user interaction, where the user interaction identifies a mouse click button and a mouse click count, where the click position, the mouse click button and the mouse click count are associated with the screen icon and where the screen icon is captured by comparing shades of colors to identify a boundary of the screen icon;

receiving, via an image processor, the captured screen icon;

generating a sub-image defined by the boundary on the screen icon and based at least in part on the click position; and automatically building a corresponding test flow graphically represented on a canvas display comprising the sub-image as defined by the boundary of the screen icon and the captured user interaction via a test flow tool that provides modeling capability through an interface comprising the canvas display and a palette display that contains a collection of modeling components for building test flows on the canvas display.

11. The method of claim 10, further comprising: receiving the captured screen icon and generating a filtered image comprising edges.

12. The method of claim 11, further comprising: identifying an edge proximate to the click position from the filtered image and generating a region based on the proximate edge.

13. The method of claim 12, further comprising: identifying a sub-image from the defined region.

14. The method of claim 10, wherein the capture tool is configured to capture a screen icon from a System Under Test.

15. The method of claim 10, the image processor further comprises: an interface configured to enable a user to confirm the captured screen icon.

16. The method of claim 10, the image processor further comprises: a tool bar for capturing the user interaction.

17. The method of claim 16, wherein the tool bar is a radial tool bar.

18. The method of claim 10, further comprising: reverting to a manual capture for capturing one or more screen icons on a System Under Test.

* * * * *